US011025564B2

United States Patent
Humphrey et al.

(10) Patent No.: US 11,025,564 B2
(45) Date of Patent: Jun. 1, 2021

(54) RDMA TRANSPORT WITH HARDWARE INTEGRATION AND OUT OF ORDER PLACEMENT

(71) Applicant: Microsoft Technology Licensing, LLC, Redmond, WA (US)

(72) Inventors: Matthew Graham Humphrey, Bellevue, WA (US); Vadim Makhervaks, Redmond, WA (US); Michael Konstantinos Papamichael, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/283,427

(22) Filed: Feb. 22, 2019

(65) Prior Publication Data
US 2020/0274832 A1    Aug. 27, 2020

(51) Int. Cl.
| | |
|---|---|
| *H04L 12/861* | (2013.01) |
| *G06F 15/173* | (2006.01) |
| *H04L 1/00* | (2006.01) |
| *G06F 16/2458* | (2019.01) |
| *G06F 9/455* | (2018.01) |
| *H04L 29/08* | (2006.01) |

(52) U.S. Cl.
CPC .... *H04L 49/9057* (2013.01); *G06F 15/17331* (2013.01); *G06F 9/45533* (2013.01); *G06F 16/2471* (2019.01); *H04L 1/0061* (2013.01); *H04L 67/1097* (2013.01)

(58) Field of Classification Search
CPC ....... G06F 11/1004; H04L 45/00; H04L 69/22
See application file for complete search history.

(56) References Cited

U.S. PATENT DOCUMENTS

| | | | |
|---|---|---|---|
| 7,383,483 B2 | 6/2008 | Biran et al. | |
| 7,398,300 B2 | 7/2008 | Elzur | |

(Continued)

FOREIGN PATENT DOCUMENTS

| | | |
|---|---|---|
| EP | 1692582 A2 | 8/2006 |
| WO | 2006076993 A1 | 7/2006 |

OTHER PUBLICATIONS

"Ethernet RDMA Technologies", Retrieved from: http://h10032.www1.hp.com/ctg/Manual/c00257031.pdf , Oct. 2003, 10 Pages.

(Continued)

*Primary Examiner* — Barbara B Anyan
(74) *Attorney, Agent, or Firm* — Newport IP, LLC; Han Gim

(57) ABSTRACT

Techniques are disclosed for implementing direct memory access in a virtualized computing environment. A new mapping of interfaces between RNIC Consumer and RDMA Transport is defined, which enables efficient retry, a zombie detection mechanism, and identification and handling of invalid requests without bringing down the RDMA connection. Techniques are disclosed for out of order placement and delivery of ULP Requests without constraining the RNIC Consumer to the ordered networking behavior, if it is not required for the ULP (e.g., storage). This allows efficient deployment of an RDMA accelerated storage workload in a lossy network configuration, and reduction in latency jitter.

20 Claims, 6 Drawing Sheets

(56) References Cited

U.S. PATENT DOCUMENTS

| | | | |
|---|---|---|---|
| 7,571,259 B2 | 8/2009 | Pong | |
| 7,760,741 B2 | 7/2010 | Biran et al. | |
| 7,765,317 B1 * | 7/2010 | Micalizzi, Jr. | H04L 1/0061 |
| | | | 709/232 |
| 7,912,979 B2 | 3/2011 | Biran et al. | |
| 8,090,790 B2 | 1/2012 | Bestler | |
| 8,161,126 B2 | 4/2012 | Fan | |
| 8,296,386 B1 * | 10/2012 | Micalizzi, Jr. | H04L 67/1097 |
| | | | 709/212 |
| 9,495,324 B2 | 11/2016 | Hefty | |
| 10,732,836 B2 * | 8/2020 | Shi | G06F 9/45533 |
| 2005/0060442 A1 | 3/2005 | Beverly et al. | |
| 2005/0132017 A1 | 6/2005 | Biran et al. | |
| 2015/0172226 A1 | 6/2015 | Borshteen et al. | |
| 2019/0102087 A1 * | 4/2019 | Shi | H04L 67/1097 |
| 2019/0102113 A1 * | 4/2019 | Choudhury | G06F 16/2471 |
| 2019/0187916 A1 | 6/2019 | Romem et al. | |
| 2020/0272579 A1 | 8/2020 | Humphrey et al. | |

OTHER PUBLICATIONS

Fox, et al., "IBM's Shared Memory Communications over RDMA (SMC-R) Protocol", Retrieved from: https://tools.ietf.org/pdf/rfc7609.pdf , Aug. 2015, 143 Pages.

"International Search Report and Written Opinion Issued in PCT Application No. PCT/US2020/017397", dated May 19, 2020, 13 Pages.

"International Search Report and Written Opinion Issued in PCT Application No. PCT/US2020/017398", dated May 19, 2020, 11 Pages.

"Non Final Office Action Issued in U.S. Appl. No. 16/283,374", dated Jun. 8, 2020, 11 Pages.

"Final Office Action Issued in U.S. Appl. No. 16/283,374", dated Oct. 16, 2020, 11 Pages.

"Advisory Action Issued in U.S. Appl. No. 16/283,374", dated Dec. 15, 2020, 5 Pages.

"Non Final Office Action Issued in U.S. Appl. No. 16/283,374", dated Jan. 22, 2021, 10 Pages.

* cited by examiner

RDMA TRANSPORT WITH HARDWARE INTEGRATION AND OUT OF ORDER PLACEMENT

BACKGROUND

A data center is a facility that houses computer systems and various networking, storage, and other related components. Data centers may, for example, provide computing services to businesses and individuals as a remote computing service or provide "software as a service" (e.g., cloud computing).

Many data centers use remote direct memory access (RDMA). RDMA is a method for direct memory access from the memory of one computer into that of another without involving either operating system. RDMA permits high-throughput, low-latency networking, which is especially useful in parallel computing environments. RDMA also allows reduced CPU utilization compared with TCP and delivers higher processing rates.

Some computing environments allow applications to directly interact with RDMA-enabled hardware, bypassing operating system overhead and being allowed with direct hardware access to application buffers and with RDMA capabilities. There are a number of drawbacks with RDMA systems with respect to interacting with RDMA-enabled hardware. Inefficiencies with interaction with RDMA-enabled hardware can be detrimental to the efficient use of computing resources. It is with respect to these considerations and others that the disclosure made herein is presented.

SUMMARY

The present disclosure describes technologies for implementing RDMA with RDMA-enabled hardware. In various embodiments, an integrated model is implemented for enabling an interface between an RDMA-enabled network interface card (RNIC) and a hardware RNIC consumer, in scenarios where a hardware device (user/client) interacts with the RNIC rather than a software user/client. In such scenarios, some software responsibilities have been offloaded to a hardware device, and the integrated model enables making the RNIC functionality available to this hardware device in a way that is optimized for this scenario rather than for the software scenario. Such a hardware device may be referred to as a hardware RNIC consumer or a hardware RNIC consumer module, which can be any user or client that interfaces with an RNIC to take advantage of RDMA capabilities of the RNIC for I/O operations. For example, the hardware RNIC consumer module may be implemented as an FPGA or ASIC. In some embodiments, the hardware RNIC consumer module may be integrated with the RNIC on the same FPGA or ASIC.

Current RDMA specifications such as the InfiniBand and iWARP specifications define verb semantics as a standard interface for communication with RDMA capable devices. While these verb semantics may be suited for software RNIC consumers, they are less so for hardware RNIC consumers. The disclosed integrated model simplifies interaction, reduces interface and interaction overhead, enables a different split of responsibilities between the RNIC and RNIC RDMA-enabled hardware, and allows further innovation and improvement of RNIC consumer capabilities while still taking advantage of the RDMA transport and networking protocol. This can allow for more efficient use of computing resources such as processor cycles, memory, network bandwidth, and power.

In the disclosed integrated model, instead of utilizing a software-optimized host interface defined by the RDMA verb specification, a hardware optimized transaction interface is implemented. The hardware optimized transaction interface effectively reduces or eliminates the RNIC host interface logic and moves some of the standard RNIC capabilities from the RNIC to the RNIC client hardware. Examples of modified or eliminated logic include memory registration and remote access semantics.

The disclosed integration model includes a hardware optimized RDMA client interface. The integration model may enable utilization of the RDMA transport functionality in a cloud-scale data center environment. In some embodiments, the integration model includes: decoupling RDMA memory management and optimizing it for the hardware RNIC consumer module; efficient retry, and responses to abandoned requests (zombie detection mechanism); identification and handling of invalid requests without bringing down the RDMA connection; out of order placement and delivery of upper layer protocol (ULP) Requests without constraining the RNIC consumer to standard ordered networking behavior; and allowing efficient deployment of RDMA accelerated workload in a lossy network configuration along with reduction in latency jitter.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

Remote Direct Memory Access (RDMA) provides the ability for one machine to directly access the memory of another machine without using the operating system networking stack of either machine, thus allowing for high-throughput, low-latency data transfers. While RDMA is growing in adoption, its benefits as a networking transport can be beneficial not only for networking communication between software processes, but also for direct communication between hardware devices. For example, RDMA may be implemented in data centers by offloading network data transfers to peripherals such as the RNIC and augmentations using programmable logic such as FPGA, thus freeing up the host CPU to focus on user applications.

In some computing environments, host networking may be configured to offload tasks to hardware devices. Such devices may be referred to as a hardware acceleration device. For example, a device may be configured to perform computing and communications tasks that are offloaded from the CPU. The device may include hardware logic for implementing functions, such as a field-programmable gate array (FPGA) device, a massively parallel processor array (MPPA) device, a graphics processing unit (GPU), an application-specific integrated circuit (ASIC), a multiprocessor System-on-Chip (MPSoC), etc., and capable of performing many of the same tasks that are typically accomplished by other devices such as the CPU. The term hardware acceleration component may also encompass other ways of leveraging a hardware acceleration device to perform a function, such as, for example, a) a case in which at least some tasks are implemented in hard ASIC logic or the like; b) a case in which at least some tasks are implemented in soft (configurable) FPGA logic or the like; c) a case in which at least some tasks run as software on FPGA software processor overlays or the like; d) a case in which at least some tasks run as software on hard ASIC processors or the like, etc., or any combination thereof. In some embodiments, the peripheral device may be a network communications device, such as a network interface card (NIC). Such a NIC may be referred to herein as a smartNIC or sNIC.

Figure 1:
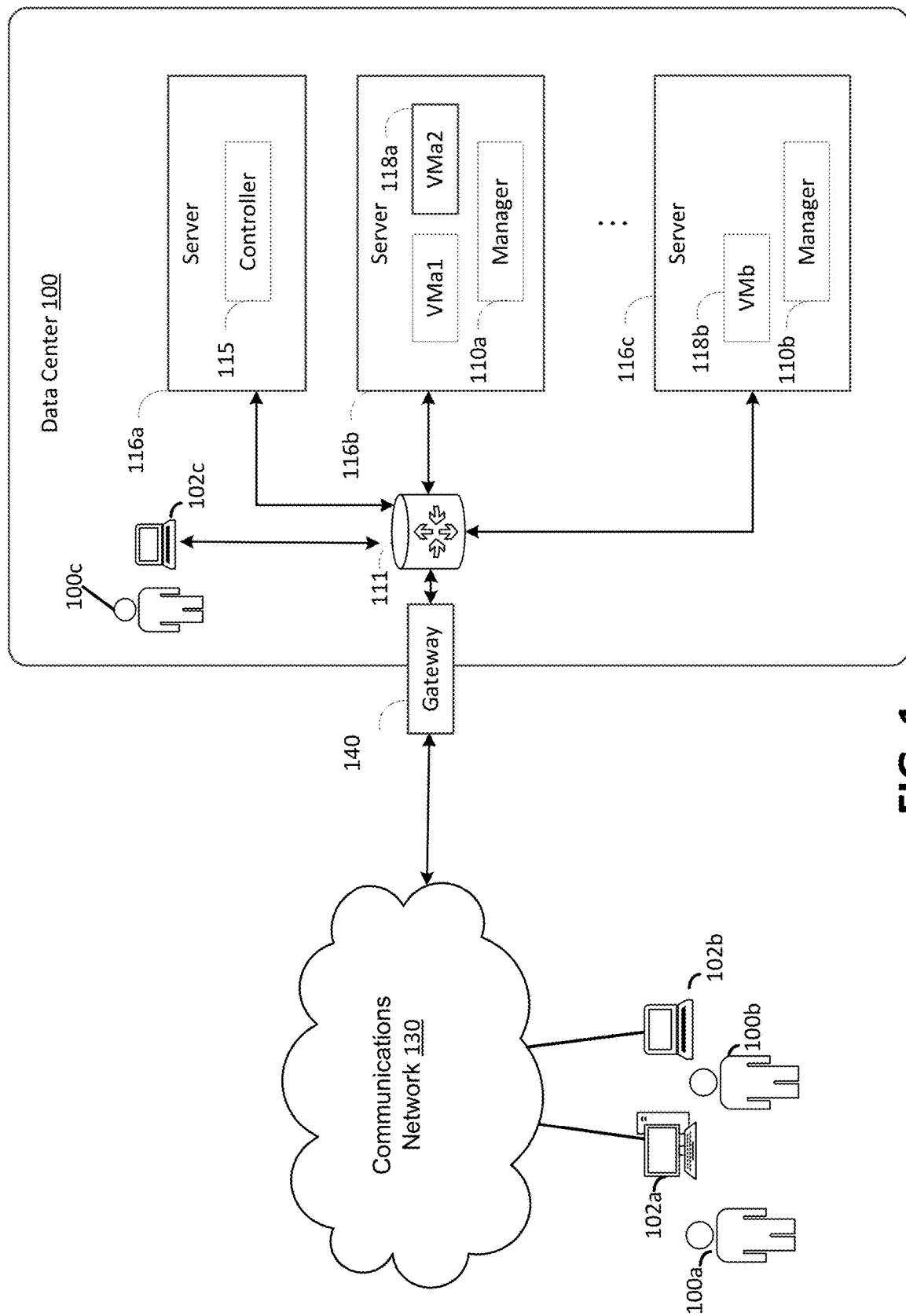
FIG. 1 is a diagram illustrating a data center in accordance with the present disclosure.

FIG. 1 illustrates an example computing environment in which the embodiments described herein may be implemented. FIG. 1 illustrates a data center 100 that is configured to provide computing resources to users 100a, 100b, or 100c (which may be referred herein singularly as "a user 100" or in the plural as "the users 100") via user computers 102a, 102b, and 102c (which may be referred herein singularly as "a computer 102" or in the plural as "the computers 102") via a communications network 130. The computing resources provided by the data center 100 may include various types of resources, such as computing resources, data storage resources, data communication resources, and the like. Each type of computing resource may be general-purpose or may be available in a number of specific configurations. For example, computing resources may be available as virtual machines. The virtual machines may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances, such as virtual machine instances or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

Data center 100 may include servers 116a, 116b, and 116c (which may be referred to herein singularly as "a server 116" or in the plural as "the servers 116") that provide computing resources available as virtual machines 118a and 118b (which may be referred to herein singularly as "a virtual machine 118" or in the plural as "the virtual machines 118"). The virtual machines 118 may be configured to execute applications such as Web servers, application servers, media servers, database servers, and the like. Other resources that may be provided include data storage resources (not shown on FIG. 1) and may include file storage devices, block storage devices, and the like. Servers 116 may also execute functions that manage and control allocation of resources in the data center, such as a controller 115. Controller 115 may be a fabric controller or another type of program configured to manage the allocation of virtual machines on servers 116.

Referring to FIG. 1, communications network 130 may, for example, be a publicly accessible network of linked networks and may be operated by various entities, such as the Internet. In other embodiments, communications network 130 may be a private network, such as a corporate network that is wholly or partially inaccessible to the public.

Communications network 130 may provide access to computers 102. Computers 102 may be computers utilized by users 100. Computer 102a, 102b or 102c may be a server, a desktop or laptop personal computer, a tablet computer, a smartphone, a set-top box, or any other computing device capable of accessing data center 100. User computer 102a or 102b may connect directly to the Internet (e.g., via a cable modem). User computer 102c may be internal to the data center 100 and may connect directly to the resources in the data center 100 via internal networks. Although only three user computers 102a, 102b, and 102c are depicted, it should be appreciated that there may be multiple user computers.

Computers 102 may also be utilized to configure aspects of the computing resources provided by data center 100. For example, data center 100 may provide a Web interface through which aspects of its operation may be configured through the use of a Web browser application program executing on user computer 102. Alternatively, a stand-alone application program executing on user computer 102 may be used to access an application programming interface (API) exposed by data center 100 for performing the configuration operations.

Servers 116 may be configured to provide the computing resources described above. One or more of the servers 116 may be configured to execute a manager 120a or 120b (which may be referred herein singularly as "a manager 120" or in the plural as "the managers 120") configured to execute the virtual machines. The managers 120 may be a virtual machine monitor (VMM), fabric controller, or another type of program configured to enable the execution of virtual machines 118 on servers 116, for example.

It should be appreciated that although the embodiments disclosed above are discussed in the context of virtual machines, other types of implementations can be utilized with the concepts and technologies disclosed herein.

In the example data center 100 shown in FIG. 1, a network device 111 may be utilized to interconnect the servers 116a and 116b. Network device 111 may comprise one or more switches, routers, or other network devices. Network device 111 may also be connected to gateway 140, which is connected to communications network 130. Network device 111 may facilitate communications within networks in data center 100, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 1 has been greatly simplified and that many more networks and networking devices may be utilized to interconnect the various computing systems disclosed herein. These network topologies and devices should be apparent to those skilled in the art.

It should also be appreciated that data center 100 described in FIG. 1 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, smartphone, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

The following Detailed Description describes technologies for implementing RDMA in a way that is more efficient for hardware RDMA consumer modules. An interface that implements RDMA, such as the RNIC interface, is described by a verbs specification and is typically optimized for interaction with software. The RNIC interface is focused on an asynchronous RNIC/software interaction model, based on a Request and Completion Queue paradigm for the hardware interface, and with memory registration semantics that allows direct access and remote access to the application buffers. While the RNIC verbs interface is well-defined and suitable for a software consumer of the RDMA Transport, it is not efficient for direct integration with a hardware device due to the implementation of processes that are not needed in a hardware integration scenario.

In the following example, an RNIC consuming hardware consumer module is described. This module implements a storage initiator and utilizes RDMA for remote access to a storage system target. The device's communication protocols over the RDMA-enabled network include:
  The module sends a request to a remote target using an RDMA Send message
  The target either reads or writes data to be stored or retrieved using an RDMA Read or an RDMA Write message, respectively.
  The target sends a response to the Initiator using an RDMA Send message
  For the target to access the initiator's data buffers using RDMA Read or RDMA Write messages, those buffers must have previously been registered with the RNIC using either memory registration or fast memory registration verb calls.

Figure 2:
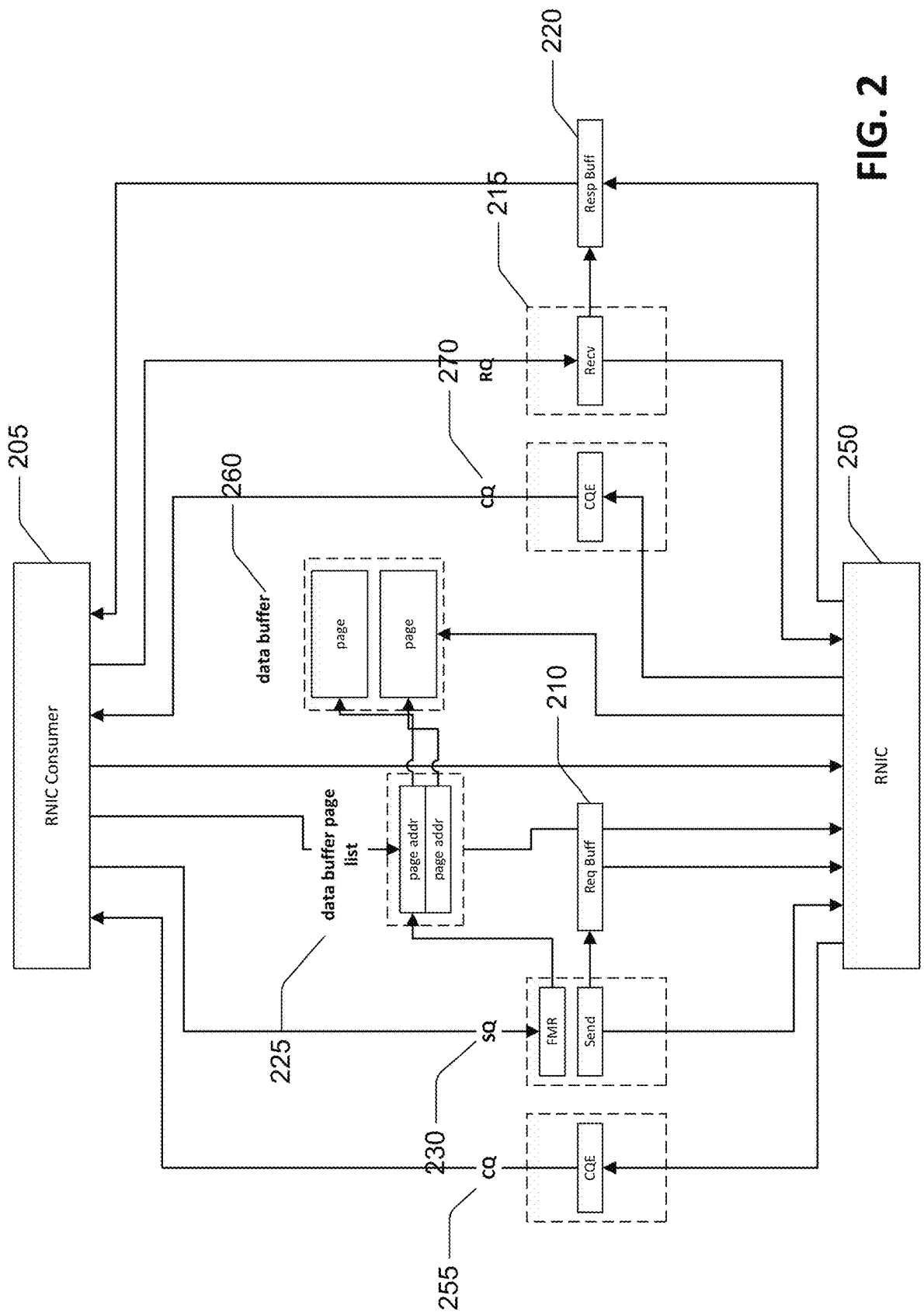
FIG. 2 is a diagram illustrating aspects of RDMA in accordance with the present disclosure.

FIG. 2 illustrates an example storage initiator and an RNIC interaction for the flow described above. The RNIC Consumer Module 205:
  Prepares a buffer 220 for the Response message
  Writes a receive descriptor to the RNIC Response Queue (RQ) 215 which refers to the response buffer 220
  Writes to the RNIC's memory-mapped I/O "doorbell" register to notify the RNIC that the RQ has a new descriptor posted
  Prepares a page list 225 representing the data buffers
  Writes to the RNIC Send Queue (SQ) a Fast Memory Registration (FMR) descriptor referring to the page list
  Prepares a Request message, and writes it into the request buffer 210
  Writes to the RNIC SQ a Send message descriptor 230 referring to the request buffer 210
  Writes to the RNIC's memory-mapped I/O "doorbell" register associated with the SQ, notifying the RNIC that a new work item has been posted to the SQ
The RNIC 250:
  Reads the FMR descriptor from the SQ, reads the page list referenced by this FMR, and then updates its Translation and Protection Table to enable RDMA access to the buffer described by the FMR
  Reads the Send SQ descriptor, and the Request from the Request buffer and then sends over the network to the Target the Request message
  Receives an Acknowledgement for the Send message and then writes a Completion to the Send Queue Completion Queue SQ CQ 255
  Receives an RDMA Read or RDMA Write message from the Target. For an RDMA Read message, the RNIC 250 reads the data from the pre-registered data buffer 260 and returns it over the network to the target. For an RDMA Write message, the RNIC 250 writes the data in the message to the pre-registered data buffer 260 and sends an acknowledgement to the Target
  Receives a Send message, from the Target, carrying a Response, Reads the next available RQ descriptor, and using the referenced buffer, copies the Response into the buffer
  Writes a Completion to the Response Queue Completion Queue (RQ CQ) 270
The RNIC Consumer:
  Reads the completion from the RQ CQ
  Reads and processes the Response from the Response buffer While this flow may be suitable for software, the flow is convoluted and inefficient for interaction between two hardware entities. For example, the flow involves unnecessary overhead that can be eliminated with a more suitable interaction model.

In an embodiment, described are RDMA remote memory access semantics and the mechanism to make such access secure that is defined in the Infiniband and iWARP specifications.

To allow remote memory access, the RNIC must be able to identify a buffer or memory region that is a target for the remote access and identify an offset within this buffer or memory region and a page list describing addresses of pages associated with the buffer in memory. The RNIC uses a Remote Key or RKey to identify the registered memory region which represents a buffer. Logically, an RKey can be seen as an index in the memory protection table that defines attributes of the respective memory region. These attributes include its state (valid, not valid), the start or the region, its size, and a reference to the page list containing the addresses of the pages that make up the buffer associated with the memory region.

RDMA requests that are accessing a memory region also specify a Virtual Address. The Virtual Address is used to specify an offset within the memory region. The memory region is associated with a Page list, which is a list of memory pages within a buffer that is pinned in memory.

RDMA Read and RDMA Write messages carry a triplet of RKey, Virtual Address, and Length to precisely identify a specific region within a preregistered data buffer. To enable remote access to the data buffer, the RNIC consumer must register the memory region, provide a page list, obtain the RKey, and determine the virtual address within that memory region. This triplet can then be advertised to the target (for example using Request Send Message in the example above), where it can be used for the remote memory access.

In an embodiment, described is an alternative integration model with hardware optimized verb semantics implemented between an in-hardware RNIC consumer module and an RNIC. The alternative integration model simplifies the interaction, reduces the interface and interaction overhead, and enables a different split of responsibilities between the RNIC and the RNIC consumer. The alternative integration model allows further innovation and improvement of RNIC consumer capabilities while still taking advantage of the RDMA transport and networking protocol.

Instead of utilizing software-optimized verbs, the alternative integration model includes hardware optimized transaction interface verbs that enables reduction or elimination of the RNIC Host Interface logic and enable moving redundant RNIC capabilities from the RNIC to the RNIC Consumer logic. In particular, memory registration and remote access semantics can be reduced or eliminated as further described herein.

Figure 3:
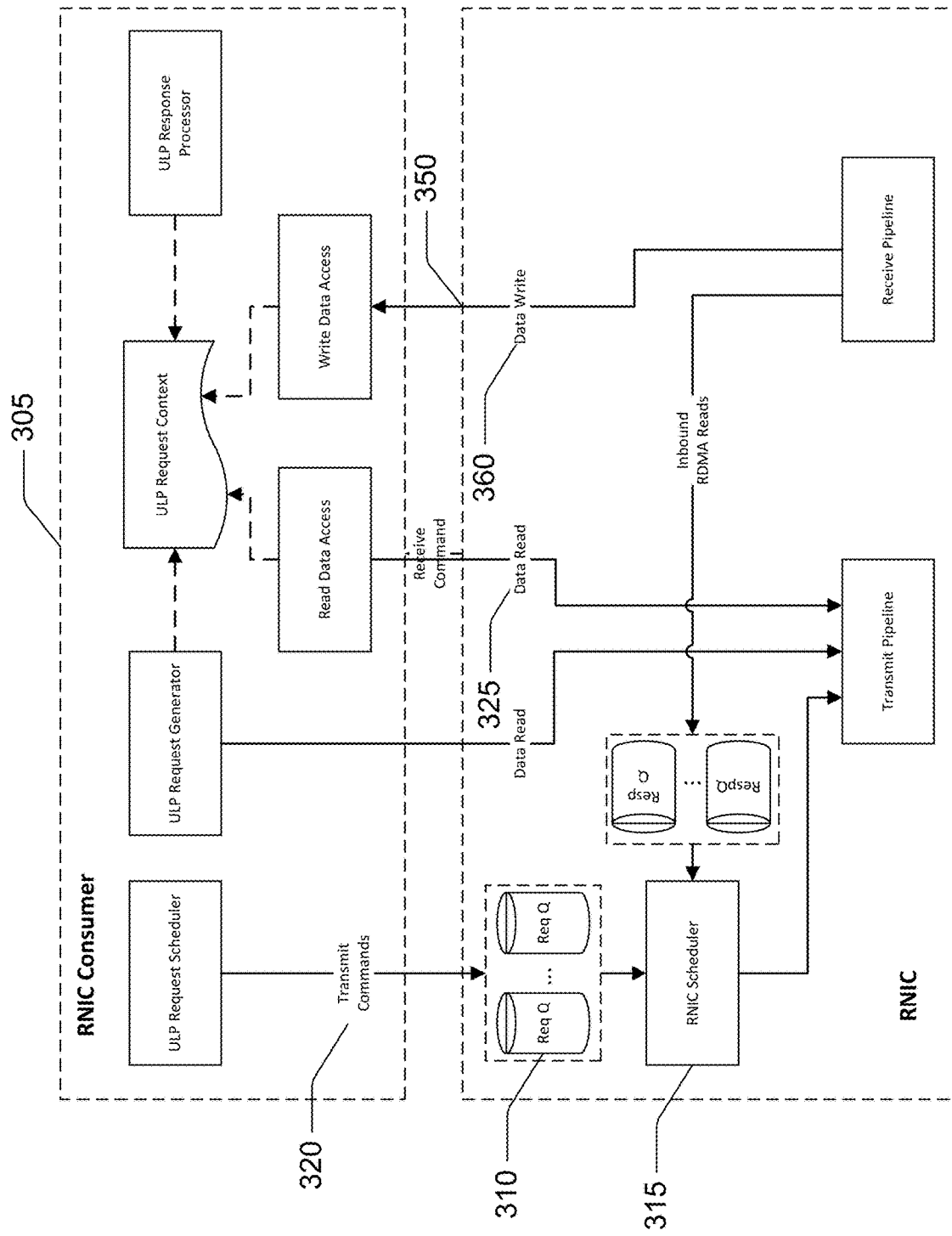
FIG. 3 is a diagram illustrating aspects of RDMA in accordance with the present disclosure.

Referring to FIG. 3, illustrated is an example of high-level interface definition semantics of hardware optimized verbs. An example of the hardware interface definition is provided herein.

Some embodiments assume that the RNIC hardware consumer module implements Upper Layer Protocol (ULP) logic. Protocol transactions or data structures may be referred to as ULP related items, such as a ULP Request, a data structure that carries ULP state, or a ULP Request Context.

In one embodiment, a high-level description of the flow utilizing hardware optimized verbs may include:

Outbound ULP Request
The RNIC Consumer 305 chooses a ULP request to serve and posts a command to the RNIC via the Transmit Command Interface 320
The RNIC 350 may queue a command to a Request Queue 310, or it may process it directly depending on the implementation of its internal transmit scheduler, its configuration, and state
The RNIC scheduler 315 selects the next command to serve and uses the Data Read Interface 325 to request that the RNIC Consumer provide the command payload. For example, the command payload can be a ULP Request.
The LKey provided in the Data Read Interface refers to the RNIC Consumer state associated with the ULP Request, for example ULP Request Context. The LKey may be provided by the hardware RNIC Consumer within the Command queued previously to the Request Queue The RNIC Consumer 305 generates a ULP Request based on the ULP request Context
The ULP Request carries an RKey and a VA referring to the ULP Request Context and the sequence number (SN) is carried by RKey and VA.
The RNIC Consumer provides data using a data read interface. The RNIC Consumer may provide a ULP request as data.
The RNIC transmits a ULP Request using an RDMA Send message Inbound RDMA Write Flow:
The RNIC receives a RDMA Write message carrying data corresponding to the ULP Request
RKey and VA in the RDMA Write packet refer to the ULP Request Context
The RNIC 350 uses a Receive Command Interface 360 to provide the RKey and VA of the received packet
The RNIC Consumer 305 resolves the data destination by using the RKey and VA to uniquely identify a ULP Request Context and an offset within any associated buffer.
The RNIC Consumer 305 uses the data write interface to consume the packet payload provided by the RNIC Inbound RDMA Read Flow
The RNIC 350 receives an RDMA Read message and queues it to an RDMA Read Response Queue
The RNIC Scheduler selects the pending request from the RDMA Read Response Queue, and uses the Data Read Interface to request the payload needed to send the RDMA Read response
RKey and VA in the RDMA Read packet refer to the ULP Request Context
The RNIC Consumer resolves the data source using the RKey and VA to uniquely identify a ULP Request Context and an offset within any associated buffer.
The RNIC Consumer responds to the data read request using a data read response interface 325
The RNIC transmits the data requested in the RDMA Read message using RDMA Read Response packets Inbound ULP Response
The RNIC receives an RDMA Send message carrying the ULP Response
The ULP Response can be associated with the ULP Request Context using its content
The RNIC uses the Receive Command Interface to indicate the ULP Response to the RNIC Consumer
The RNIC Consumer uses a data write interface 350 to consume the ULP Response payload provided by the RNIC, and processes it on the fly.

Table 1 includes an example mapping of RDMA semantics to the RNIC Consumer.

TABLE 1

Example of Integrated Model and Mapping of RDMA Semantics

| Field name | Description |
| --- | --- |
| lkey | Used by the RNIC to access local buffers (provided in the Transmit Request Transaction). Refers to the ULP Request Context associated with request |
| rkey | Used by the RNIC to access remotely advertised buffers accessed by RDMA Reads and RDMA Writes Refers to the ULP Request Context corresponding to the IO |

TABLE 1-continued

Example of Integrated Model and Mapping of RDMA Semantics

| Field name | Description |
|---|---|
| QPN | RNIC Queue-Pair Number, Provided thru RNIC interfaces Stored in the ULP Request Context for remote access validation purpose |
| va | Virtual Address Opaque Used by the RNIC Consumer to provide an offset within the remotely accessible data or metadata buffer. Used by the RNIC Consumer to carry a part of the generation SN allowing to validate remote access |

The RNIC Consumer may have multiple outstanding ULP requests sent for processing to the Target. The Target platform can be implemented as a large-scale distributed system, such as a storage system. ULP Requests concurrently processed by the large-scale distributed storage system can be processed in parallel by different storage nodes which can take different times to perform the processing. In such systems, ULP requests can be processed and completed out of order. Given the wide variety of failure scenarios, such as a node failure, networking partitioning, etc., some of the requests might take a relatively long time to complete, or even not complete at all.

It is desirable to track outstanding ULP requests, so that requests not completed within some time limit can be retried or reported as failed. Resources allocated for these failed requests must eventually be reclaimed for use on other requests. The RNIC consumer needs the ability to identify timed out or orphaned requests so that resources can be reassigned and reused.

In an embodiment, the RNIC Consumer may use a Sequence Number (SN) to accomplish this goal. The RNIC Consumer may implement a large (for example, 48 bit) counter that is incremented with each new request that the RNIC Consumer is submitting. For each new request, the RNIC Consumer may save the current counter value into the Sequence Number associated with the request and increment the counter value. This Sequence Number may be stored in the ULP Request Context.

When generating a new ULP Request, the RNIC Consumer may update the ULP Request header with a request sequence number and a reference to the ULP Request Context. Those fields may be returned within the header of a ULP Response message. The RNIC Consumer may use those fields to identify the ULP Request Context that was assigned to the request. This context is retrieved and the embedded sequence number is compared against the value returned in the response message. If the Sequence Number matches, then the ULP Response corresponds to the original request and can be considered valid. In the case where the two sequence numbers do not match, the ULP Response is invalid (referred to as a "zombie response" or an "orphaned response") and processing of the ULP Response should be skipped or handled as an error.

For RDMA Reads and Writes, a reference to the ULP Request Context and a sequence number are encoded within the RKey and/or virtual address that is sent along in the ULP request, as described further below. These values may be used for validation that the specific RDMA packet represents a valid RDMA transaction for the ULP Request Context.

Rkey and the virtual address are normally managed by the RNIC as part of memory registration. Since memory registration is not needed in a hardware-optimized model, the RNIC need not interpret the virtual address and can just send it along to the RNIC consumer.

Since the RNIC Consumer provides all access to the data, it can use RKey and VA to encode whatever information is necessary to locate this data upon later receiving the RDMA read or write request.

The RKey and VA may carry encoding of the client-specific lookup key and generation number (SN). For example, the RKey can carry an encoding of the ULP Request Context index in some table of active ULP Request contexts. RKey can also carry some of the higher bits of the generation SN used for the zombie RDMA access identification. Table 2 provides an example of RKey encoding.

TABLE 1

Example of RKey Encoding

| Field name | bits | Description |
|---|---|---|
| SN High | 8 b | High 8 bits of the Sequence Number. Used in concatenation with SN Low bits from VA. Allows identification of zombie RDMA Access, and reuse of ULP Request Context without waiting for completion from Backend Server |
| Reserved | 4 b | |
| ULP Request Context Index | 20 b | Index of the ULP Request Context in some ULP Request context table. The actual buffer to be accessed is stored in the ULP Request Context, and can be retrieved by using this index to look up and retrieve the ULP Request Context |

The Virtual Address (VA) can be used to provide an offset of the buffer identified by RKey. In addition to the offset, a portion of the VA can be used to carry other information, for example the low bits of generation SN used to validate RDMA access.

TABLE 2

Example of Virtual Address Encoding

| Field name | bits | Description |
|---|---|---|
| SN Low | 40 b | Low 40 bits of the Generation Sequence Number |
| Reserved | 4 b | |
| Offset | 20 b | Offset of the RDMA Access within the IO data or metadata buffer |

InfiniBand and iWARP verb semantics define the Receive Queue (RQ) as a mechanism for the RNIC Consumer to provide buffers for the received Send messages, and the Completion Queue (RCQ) associated with the Receive Queue as a mechanism to notify the software RNIC Consumer about delivery of received Send messages. While this mechanism may be applicable for interaction with software, it comes at the expense of a PCIe/memory read from the RQ to identify a target buffer for the inbound Send packet, a PCIe/memory write to RCQ, an additional state in the RNIC Transport Engine, an interrupt, and RQ/RCQ doorbells.

Hardware optimized verb semantics, described further below, allow for the elimination of the need in RQ/RCQ semantics for the hardware RNIC Consumer, and allows for delivery of inbound Send messages directly without storing through the memory. The hardware RNIC Consumer can process and consume inbound Send messages on-the-fly, for example ULP Responses. Since inbound Send packets are delivered directly via the transaction interface, there is no need to implement a separate receive completion interface.

The InfiniBand and iWARP specifications define semantics for Memory Registration to allow local and remote access to the software RNIC Consumer buffers. Each buffer must be registered as a part of memory region and identified by an RKey and Virtual Address (VA).

When using standard memory registration and the remote access model, the RNIC Consumer must register buffers ahead of time, independent of the actual remote access to the buffer. Actual remote access to the pre-registered buffer is done independently and without any notification to the RNIC Consumer. This model may be advantageous for the software RNIC Consumer, allowing one-sided RDMA Read and Write operations that do not consume CPU cycles on the remote machine.

In an embodiment, hardware optimized verbs may form part of the alternative integration model without using implicit memory registration semantics. The RKey and VA are managed by the RNIC Consumer, who is responsible for generation of the RKey and VA, their association with buffers and other corresponding resources, and processing and consumption of data buffer access requests for the remote accesses by both the transmit and receive RNIC pipelines.

The hardware RNIC Consumer may define and use the RKey and VA as described herein. This definition allows use of both the RKey and VA to identify the ULP Request Context and respective data buffers used for the data and metadata transfers, as well as to identify invalid remote accesses as described below.

An Invalid RDMA Access on the standard RDMA connection typically results in an abortive connection termination. Re-establishment of the RDMA connection carries significant overhead and latency, and thus it is desirable to reduce this overhead in cloud-scale deployments of RDMA. An Invalid RDMA access is typically detected by the RNIC based on the Memory Region configuration, its state, base, and bounds checks, etc. As discussed above, large-scale distributed systems bring additional complexity in managing RNIC resources associated with outstanding ULP requests.

Eliminating the need for standard Memory Registration semantics and instead allowing the RNIC Consumer to manage and validate remote memory access allows for the handling of invalid RDMA accesses in a more efficient fashion without necessarily bringing the RDMA connection down and thus impacting other in-flight requests. For example, the RNIC Consumer may associate the RKey and VA with a ULP Request Context, as described above, and rely on the request related information stored in the ULP Context to allow base and bounds checks. Additionally, Sequence Number validation may be used to identify RDMA transfers associated with timed out, retried, or lost ULP Requests. The result of Sequence Number validation may take priority over base and bounds checks.

Depending on the type of RDMA access, the RNIC Consumer may perform the following actions to recover from an invalid RDMA access:

Inbound RDMA Write packet
  A packet identified as a zombie (i.e., carrying an invalid Sequence Number, or targeting an Invalid ULP Request Context) can be silently dropped.
Inbound RDMA Read message, resulting in outbound RDMA Read Response packets A packet identified as a zombie (i.e. carrying an invalid Sequence Number, or targeting an Invalid ULP Request Context) can result in the RNIC Consumer generating filler data, and inverting data CRCs to make sure that the Target, or Back-end Server can identify the data as invalid, and respond with a failed ULP Response.

Both cases can be handled without impacting the RDMA connection and other in-flight ULP Requests that have been processed on the same connection.

The Infiniband-based RoCE standard assumes a lossless network configuration. The iWARP standard was defined to allow lossy networks, and extended the Infiniband definition to allow packet drops and out of order packet placement with in-order delivery.

While a lossless network configuration simplifies RNIC Transport implementation, it comes with implications of increased congestion caused by link level flow control. Uncontrolled congestion can cause severe network utilization degradation and impact overall system performance, especially in cloud-scale deployment scenarios. One way to resolve increasing congestion is to avoid using a lossless network, and adapt the RNIC implementation to deal better with limited packet loss.

While out-of-order packet placement introduced by the iWARP specification may allow for improving RDMA performance in a lossy networking environment and reduce reordering buffer space requirements, the iWARP specification still forces an in-order network processing model on RNIC Consumers.

In an embodiment, the disclosed hardware RNIC consumer interaction model with RNIC can be used to extend processing of out-of-order received packets by the RNIC Consumer to allow out of order delivery of ULP Requests. Depending on the ULP, there may be no ordering requirement or dependency between different requests on the same or different RDMA connections, for example as is the case for a Storage RDMA Consumer. The only requirement is to have all RDMA transactions involved in processing a storage request to be completed. The ULP request can be completed as well, regardless of the status of other ULP Requests that were posted prior or after on the same or different RDMA connections.

The described out of order delivery model may allow for significantly reducing the performance impact of a network packet drop to the overall system performance. Only ULP Requests associated with the dropped packet may be impacted, while other requests may be completed as if no packet was dropped. The described out of order delivery model may allow for improvements in jitter and high percentile latencies throughout the system or network.

The RNIC Consumer may track all RDMA transactions per request. This can be performed via the ULP Request Context, and the RNIC may provide the RNIC Consumer with RDMA and Send packets received out of order. In some embodiments, the RNIC consumer may detect an out of order condition within the ULP Request, and handle it transparently by resubmitting the request associated with that ULP Request.

Further described below are semantics for interfaces between the RNIC Consumer and the RDMA Transport.

The RNIC Consumer may use the Transmit Command Interface to submit new ULP Requests to be transmitted by the RNIC. Table 4 lists the primary fields, and is not a full interface definition.

TABLE 3

Transmit Command Interface

| Field name | bits | Description |
|---|---|---|
| qpn | 16 b | Index of associated RNIC QP requests<br>This field is used by the RNIC to queue requests to the corresponding SQ. The QPN represents a connection to some remote RNIC-enabled node. |
| opcode | 3 b | Depending on the ULP requirements, the RNIC Consumer may need some subset of the verbs, but Send,<br>RDMA Write, RDMA Read and Send & Invalidate requests (hardware acceleration of the backend) are sufficient for the majority of applications. |
| length | 32 b | Length of the payload to be sent with the message.<br>The RNIC Consumer may use this interface to post single<br>packet Send requests<br>Can be scaled down if future extensions are ignored (message length for RDMA Write and RDMA Read) |
| lkey | 32 b | Reference to the local buffer.<br>Used by the RNIC when requesting a payload corresponding to the command |

The RNIC may queue requests to the SQ associated with the QPN. The SQ may be used to schedule transmission of new requests and retransmissions.

The RNIC Consumer may maintain a number of in-flight requests posted to the RNIC SQ. A new request can be posted to the SQ if the total number of in-flight requests does not exceed the SQ depth. The number of requests in-flight may be updated with each posted request, and with a notification through the completion interface described below. In some embodiments, the ULP may be allowed to manage the number of in-flight requests (and in-flight read requests), freeing the RNIC implementation from this detail.

Once the RDMA Transport has selected a SQ or corresponding Read Response Queue to serve, it may use the Data Read interface to request the RNIC Consumer to provide the needed payload. This interface may be used to retrieve the payload of the Send and RDMA Write requests posted to the SQ, and the requested data for an RDMA Read Request.

The Transmit Command Interface definition assumes that the RDMA Transport Engine Scheduler is responsible for determining which Queue and which request to serve, based on the ETS configuration. Thus, if one traffic class (TC) has a higher priority than another, it may be enforced by the scheduler based on the configuration. The Data Read Interface may operate in units of burst of networking packets. The number of packets in a burst can be configurable.

The Data Read Interface (DRI) interface may be used by the RDMA Transport to retrieve data for both newly transmitted packets and for packets being retransmitted. Order of packet scheduling and their location within the overall message payload may be controlled by the RDMA Transport, and may not be sequential within the QP.

TABLE 4

Data Read Interface

| Field name | bits | Description |
|---|---|---|
| qpn | 16 b | Needed for remote access validation, to make sure that the rkey is accessed by the QPN with which it is currently associated with |
| remote_access | 1 b | Clear for SQ operations<br>Set for RDMA Read Response |
| retransmission | 1 b | Set - indicates that this data read corresponds to a packet retransmission |
| length | 12 b | Data transfer length.<br>Limited to the data required for a single networking packet or a single packet burst |
| lkey/rkey | 32 b | lkey - used for Send and RDMA Writes<br>rkey - used for RDMA Read Response<br>lkey/rkey referring to the location of a data buffer or the ULP Request Context |
| va | 64 b | For local access indicates an offset.<br>For Send is ignored and would typically be zero<br>For remote access (RDMA Read Response) the offset within the read data and optionally other information such as the SN |

A Receive Command Interface (RCI) may be implemented and used to indicate to the RNIC Consumer various messages received by the RNIC. An example is described in Table 6. The messages may include received RDMA Send and RDMA Write messages. The RCI may indicate one received packet at a time.

TABLE 5

Receive Command Interface

| Field name | bits | Description |
|---|---|---|
| qpn | 16 b | QPN with which the messages are associated<br>Used by the RNIC Consumer to validate access for RDMA Writes |
| opcode | 3 b | RDMA Send or RDMA Write<br>Optionally, RDMA Read commands can also be indicated, although for many applications handling these<br>via the DRI is sufficient |
| va | 64 b | Used for RDMA Write or RDMA Read<br>Carries the buffer offset, and optionally other information<br>such as the SN |
| rkey | 32 b | Used for RDMA Write or RDMA Read<br>Refers to the ULP Request Context, and indirectly indicates that data to access |
| length | 12 b | Length of the RDMA packet payload<br>RDMA Transport indicates commands in units of packets |

The RDMA packet payload may be provided via a data FIFO interface. The RDMA Transport may provide separate command and data interfaces, allowing the RNIC Consumer to pipeline command and data processing. Inbound RDMA packets may be delivered to the RNIC Consumer in-order within the RDMA QP.

For each SQ completion, the RNIC Consumer may increment the completed SQ message counter, which may be compared with a posted SQ message counter to evaluate the number of messages posted to the SQ.

TABLE 6

Send Completion Interface

| Field name | bits | Description |
|---|---|---|
| qpn | 16 b | QPN messages received. |

The error notification interface may be used to convey errors detected by the RDMA Transport. The errors may be critical and result in a specified QP going into the error state.

TABLE 7

Error Notification Interface

| Field name | bits | Description |
|---|---|---|
| qpn | 16 b | QPN messages received. |
| syndrome | 16 b | Error syndrome |

Figure 4:
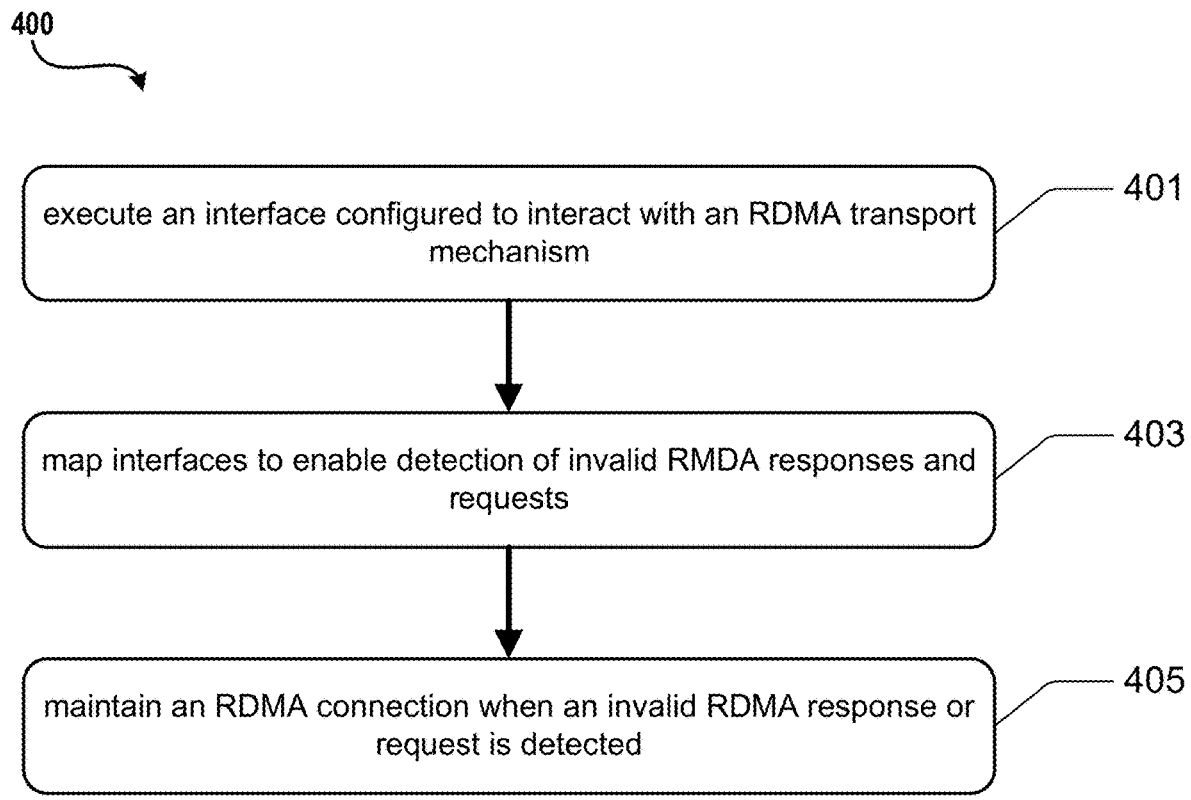
FIG. 4 is a flowchart depicting an example procedure for direct memory access in accordance with the present disclosure.

Turning now to FIG. 4, illustrated is an example operational procedure for direct memory access in accordance with the present disclosure. The operational procedure may be implemented in a remote direct memory access (RDMA) capable device comprising programmable logic that, when executed by the RDMA capable device, cause the RDMA capable device to perform the operations. Referring to FIG. 4, operation 401 illustrates instantiating an interface configured to interact with an RDMA transport mechanism.

Operation 401 may be followed by operation 403. Operation 403 illustrates mapping interfaces to enable detection of invalid RMDA responses and requests.

Operation 403 may be followed by operation 405. Operation 405 illustrates maintaining an RDMA connection when an invalid RDMA response or request is detected.

Figure 5:
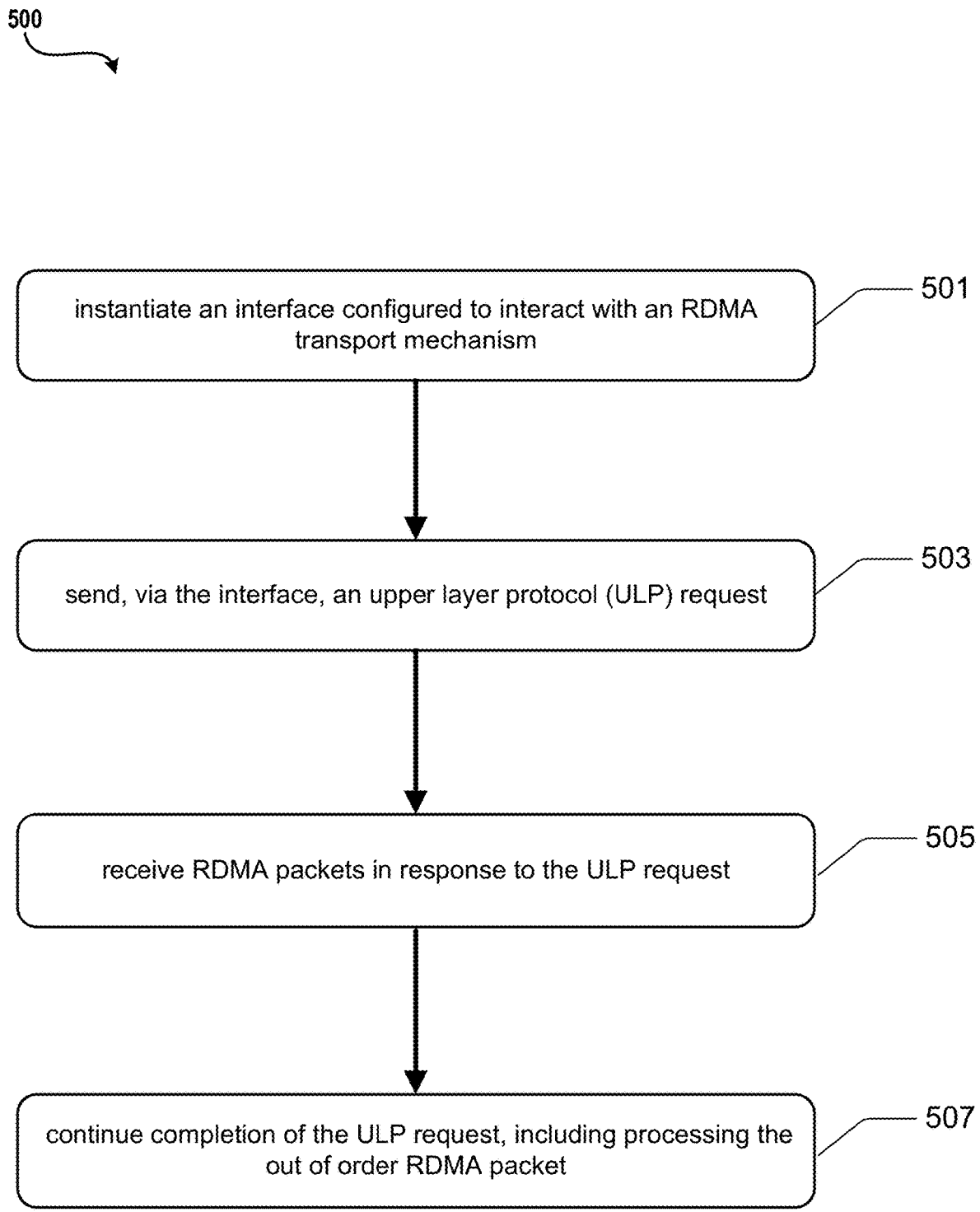
FIG. 5 is a flowchart depicting an example procedure for direct memory access in accordance with the present disclosure.

Referring to FIG. 5, illustrated is another example operational procedure for direct memory access in a virtualized computing environment. The operational procedure may be implemented in a network interface device. The network interface device may include programmable logic that, when executed by the network interface device, cause the network interface device to perform the described operations. Referring to FIG. 5, operation 501 illustrates instantiating an interface configured to interact with an RDMA transport mechanism.

Operation 501 may be followed by operation 503. Operation 503 illustrates sending, via the interface, an upper layer protocol (ULP) request.

Operation 503 may be followed by operation 505. Operation 505 illustrates receiving RDMA packets in response to the ULP request.

Operation 505 may be followed by operation 507. Operation 507 illustrates continue completion of the ULP request, including processing the out of order RDMA packet.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, a computing system, an article of manufacture, such as a computer-readable storage medium, or a component including hardware logic for implementing functions, such as a field-programmable gate array (FPGA) device, a massively parallel processor array (MPPA) device, a graphics processing unit (GPU), an application-specific integrated circuit (ASIC), a multiprocessor System-on-Chip (MPSoC), etc. A component may also encompass other ways of leveraging a device to perform a function, such as, for example, a) a case in which at least some tasks are implemented in hard ASIC logic or the like; b) a case in which at least some tasks are implemented in soft (configurable) FPGA logic or the like; c) a case in which at least some tasks run as software on FPGA software processor overlays or the like; d) a case in which at least some tasks run as software on hard ASIC processors or the like, etc., or any combination thereof. A component may represent a homogeneous collection of hardware acceleration devices, such as, for example, FPGA devices. On the other hand, a component may represent a heterogeneous collection of different types of hardware acceleration devices including different types of FPGA devices having different respective processing capabilities and architectures, a mixture of FPGA devices and other types hardware acceleration devices, etc.

Figure 6:
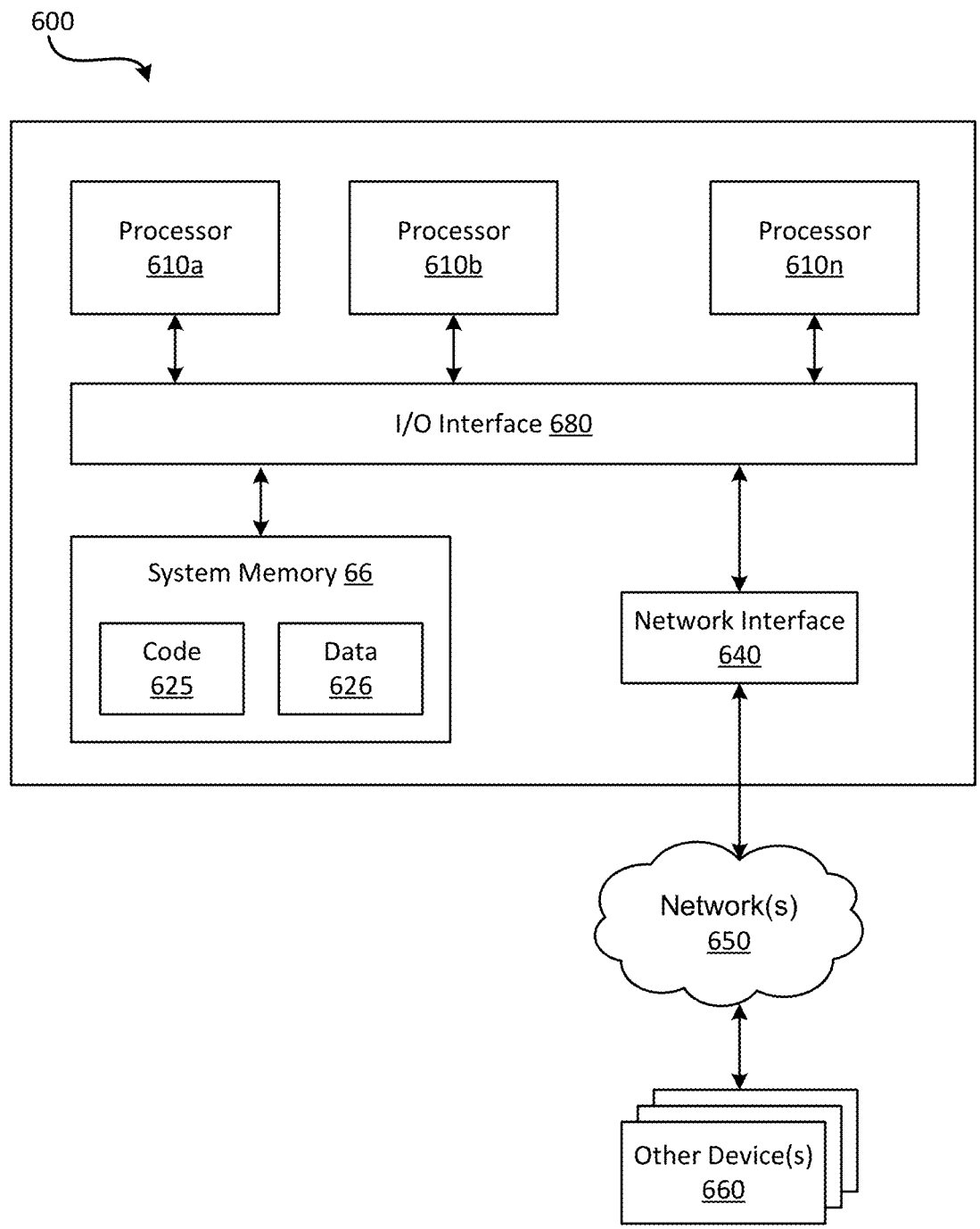
FIG. 6 is an example computing device in accordance with the present disclosure.

FIG. 6 illustrates a general-purpose computing device 600. In the illustrated embodiment, computing device 600 includes one or more processors 610a, 610b, and/or 610n (which may be referred herein singularly as "a processor 610" or in the plural as "the processors 610") coupled to a system memory 66 via an input/output (I/O) interface 630. Computing device 600 further includes a network interface 640 coupled to I/O interface 630.

In various embodiments, computing device 600 may be a uniprocessor system including one processor 610 or a multiprocessor system including several processors 610 (e.g., two, four, eight, or another suitable number). Processors 610 may be any suitable processors capable of executing instructions. For example, in various embodiments, processors 610 may be general-purpose or embedded processors implementing any of a variety of instruction set architectures (ISAs), such as the x86, PowerPC, SPARC, or MIPS ISAs, or any other suitable ISA. In multiprocessor systems, each of processors 610 may commonly, but not necessarily, implement the same ISA.

System memory 66 may be configured to store instructions and data accessible by processor(s) 610. In various embodiments, system memory 66 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 66 as code 625 and data 626.

In one embodiment, I/O interface 630 may be configured to coordinate I/O traffic between the processor 610, system memory 66, and any peripheral devices in the device, including network interface 640 or other peripheral interfaces. In some embodiments, I/O interface 630 may perform any necessary protocol, timing, or other data transformations to convert data signals from one component (e.g., system memory 66) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components. Also, in some embodiments some or all of the functionality of I/O interface 630, such as an interface to system memory 66, may be incorporated directly into processor 610.

Network interface 640 may be configured to allow data to be exchanged between computing device 600 and other device or devices 660 attached to a network or network(s) 650, such as other computer systems or devices as illustrated in FIGS. 1 through 4, for example. In various embodiments, network interface 640 may support communication via any suitable wired or wireless general data networks, such as types of Ethernet networks, for example. Additionally, network interface 640 may support communication via telecommunications/telephony networks such as analog voice networks or digital fiber communications networks, via storage area networks such as Fibre Channel SANs or via any other suitable type of network and/or protocol.

In some embodiments, system memory 66 may be one embodiment of a computer-accessible medium configured to store program instructions and data as described above for FIGS. 1-19 for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 600 via I/O interface 630. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 600 as system memory 66 or another type of memory. Further, a computer-accessible medium may include transmission media or signals such as electrical, electromagnetic or digital signals, conveyed via a communication medium such as a network and/or a wireless link, such as may be implemented via network interface 640. Portions or all of multiple computing devices, such as those illustrated in FIG. 6, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 8, may include other components that are not explicitly shown in FIG. 6, or may utilize an architecture completely different than that shown in FIG. 6.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

EXAMPLE CLAUSES

The disclosure presented herein encompasses the subject matter set forth in the following example clauses.

Example Clause A, a remote direct memory access (RDMA) capable network interface card (RNIC) consumer module comprising logic that configures the RNIC consumer module to perform operations comprising: execute an interface configured to interact with an RDMA transport mechanism; map interfaces to enable detection of invalid RMDA responses and requests; and maintain an RDMA connection when an invalid RDMA response or request is detected.

Example Clause B, the RNIC consumer module of Example Clause A, wherein the RNIC is implemented as an FPGA or ASIC.

Example Clause C, the RNIC consumer module of any one of Example Clauses A through B, wherein the RNIC consumer module is configured to generate, allocate, and manage remote access identifiers.

Example Clause D, the RNIC consumer module of any one of Example Clauses A through C, wherein the remote access identifiers are a Remote Key (RKey) and virtual address (VA).

Example Clause E, the RNIC consumer module of any one of Example Clauses A through D, wherein the RDMA capable device is configured to pass the RKey and VA in lieu of implementing memory registration and remote access semantics.

Example Clause F, the RNIC consumer module of any one of Example Clauses A through E, wherein:
the RKey and VA are associated with an RNIC consumer request; and
the RDMA capable device is configured to use the RKey to identify an RNIC consumer request context and use the VA to specify an offset within the RNIC consumer request.

Example Clause G, the RNIC consumer module of any one of Example Clauses A through F, wherein the RNIC consumer request context is used to identify data buffers associated with the RNIC consumer request.

Example Clause H, the RNIC consumer module of any one of Example Clauses A through G, wherein the RDMA capable device is configured to use the RKey and VA to communicate a sequence number usable to identify invalid RDMA accesses.

Example Clause I, the RNIC consumer module of any one of Example Clauses A through H, wherein the sequence number is matched against a sequence number within a request context to identify an invalid RDMA access.

While Example Clauses A through I are described above with respect to a RNIC consumer module, it is understood in the context of this disclosure that the subject matter of Example Clauses A through I can additionally or alternatively be implemented by a device or via a method.

Example Clause J, a device comprising at least one module configured to perform operations comprising:
instantiating an interface to an application configured to interact with an RDMA transport mechanism;
mapping interfaces to enable retry and zombie detection; and
maintaining an RDMA connection when an invalid RDMA request is identified.

Example Clause K, the device of Example J, wherein:
an upper layer protocol (ULP) response includes a sequence number and an RNIC consumer request context identifier; and
a sequence number carried by the ULP response is matched against a sequence number within a request context to identify an invalid ULP Response message.

Example Clause L, the device of any one of Example Clauses J through K, further configured to perform operations comprising:
dropping invalid RDMA writes identified by the sequence number without changing a state of an RDMA connection used for RDMA writes.

Example Clause M, the device of any one of Example Clauses J through L, further configured to perform operations comprising:
generating padding data for RDMA read responses without changing a state of an RDMA connection used for RDMA writes.

Example Clause N, the device of any one of Example Clauses J through M, further configured to perform operations comprising:
inverting cyclic redundancy checks (CRCs) for the generated padding data; and detecting invalid data transfers based on the inverted CRCs.

Example Clause O, the device of any one of Example Clauses J through N, further configured to perform operations comprising:
communicate with a transaction interface configured to transmit inbound ULP responses without reading receive queue (RQ) descriptors or implementing RQ semantics.

While Example Clauses J through O are described above with respect to a device, it is understood in the context of this disclosure that the subject matter of Example Clauses A through I can additionally or alternatively be implemented by a RNIC consumer module or via a method.

Example Clause P, a method for implementing remote direct memory access (RDMA) in a networked computing environment comprising one or more computing devices, the method comprising:

enabling an RDMA transport interface configured to receive RDMA requests from an application;

mapping interfaces to enable detection of zombie responses and requests; and maintaining a current RDMA connection when a zombie response or request is detected.

Example Clause Q, the method of Example Clause P, further comprising: generating and allocating remote access identifiers; and communicating the remote access identifiers to the application in lieu of enabling memory registration and remote access semantics.

Example Clause R, the system of any of Example Clauses P through Q, further comprising:

based on the remote access identifiers, identifying an RNIC consumer request context and specifying an offset within an RNIC consumer request; and based on the RNIC consumer request context, identifying data buffers associated with the RNIC consumer request.

Example Clause S, the method of any one of Example Clauses P through R, further comprising using the remote access identifiers to communicate a sequence number usable to identify invalid RDMA accesses, wherein the sequence number is matched against a sequence number within a request context to identify an invalid RDMA access.

Example Clause T, the method of any one of Example Clauses P through S, further comprising:

matching a sequence number carried by an upper layer protocol (ULP) response against a sequence number within a request context to identify an invalid ULP Response message.

While Example Clauses P through T are described above with respect to a method, it is understood in the context of this disclosure that the subject matter of Example Clauses A through I can additionally or alternatively be implemented by a RNIC consumer module or via a device.

The disclosure presented herein encompasses the subject matter set forth in the following example clauses.

Example Clause AA, a remote direct memory access (RDMA) capable network interface card (NIC) consumer module comprising logic that configures the RNIC consumer device to perform operations comprising:

instantiate an interface configured to interact with an RDMA transport mechanism;

send, via the interface, an upper layer protocol (ULP) request;

receive RDMA packets in response to the ULP request; and in response to receiving an out of order RDMA packet, continue completion of the ULP request, including processing the out of order RDMA packet.

Example Clause BB, the RNIC consumer module of Example Clause AA, wherein the RDMA transport mechanism is implemented in a lossy network.

Example Clause CC, the RNIC consumer module of any one of Example Clauses AA through BB, wherein headers of the RDMA packets include data usable to allow independent and out of order packet placement.

While Example Clauses AA through CC are described above with respect to a RNIC consumer module, it is understood in the context of this disclosure that the subject matter of Example Clauses AA through CC can additionally or alternatively be implemented by a device or via a method.

Example Clause DD, a device comprising at least one module configured to perform operations comprising:

instantiate an interface configured to interact with an RDMA transport mechanism; send, via the interface, an upper layer protocol (ULP) request;

receiving RDMA packets in response to the ULP request; and in response to receiving an out of order RDMA packet, continue completion of the ULP request, including processing the out of order RDMA packet.

Example Clause EE, the device of Example Clause DD, further configured to perform operations comprising using a Remote Key (RKey) and virtual address (VA) to identify a RNIC consumer request context and to access destination buffers.

Example Clause FF, the device of any one of Example Clauses DD through EE, further configured to perform operations comprising using received out of order RDMA Write and Read packets to identify a RNIC consumer request context and to access destination buffers.

Example Clause GG, the device of any one of Example Clauses DD through FF, further configured to perform operations comprising using a most significant nibble (MSN) of a received send message and a payload of a ULP response to identify a corresponding RNIC consumer request context.

Example Clause HH, the device of any one of Example Clauses DD through GG, configured to perform operations comprising tracking RDMA transfers and ULP responses associated with an RNIC consumer request context.

Example Clause II, the device of any one of Example Clauses DD through HH, further configured to perform operations comprising completing an RNIC consumer request in response to detection of all required RDMA transfers and ULP responses even if portions of the RDMA transfers and ULP responses arrived out of order.

Example Clause JJ, the device of any one of Example Clauses DD through II, further configured to perform operations comprising completing an RNIC consumer request out of order with respect to other requests processed on a same or different RNIC queue pair (QP).

Example Clause KK, the device of any one of Example Clauses DD through JJ, further configured to perform operations comprising completing RNIC consumer requests prior to in-order completion and delivery of all preceding packets on the same RNIC queue pair (QP).

While Example Clauses DD through KK are described above with respect to a device, it is understood in the context of this disclosure that the subject matter of Example Clauses SS through KK can additionally or alternatively be implemented by a RNIC consumer module or via a method.

Example Clause LL, a method for implementing remote direct memory access (RDMA) in a networked computing environment comprising one or more computing devices, the method comprising:

instantiating an interface configured to interact with an RDMA transport mechanism;

sending, via the interface, an upper layer protocol (ULP) request;

receiving RDMA packets in response to the ULP request; and in response to receiving an out of order RDMA packet, continue completion of the ULP request, including processing the out of order RDMA packet.

Example Clause MM, the method of Example Clause LL, wherein headers of the RDMA packets include data usable to allow independent and out of order packet placement.

Example Clause NN, the method of any one of Example Clauses LL through MM, further comprising using a Remote Key (RKey) and virtual address (VA) to identify a RNIC consumer request context and to access destination buffers.

Example Clause OO, the method of any one of Example Clauses LL through NN, further comprising using received out of order RDMA Write and Read packets to identify a RNIC consumer request context and to access destination buffers.

Example Clause PP, the method of any one of Example Clauses LL through OO, further comprising using a most significant nibble (MSN) of a received send message and a payload of a ULP response to identify a corresponding RNIC consumer request context.

Example Clause QQ, the method of any one of Example Clauses LL through PP, further comprising tracking RDMA transfers and ULP responses associated with an RNIC consumer request context.

Example Clause RR, the method of any of Example Clauses LL through QQ, further comprising completing an RNIC consumer request in response to detection of all required RDMA transfers and ULP responses even if portions of the RDMA transfers and ULP responses arrived out of order.

Example Clause SS, the method of any one of Example Clauses LL through RR, further comprising completing an RNIC consumer request out of order with respect to other requests processed on a same or different RNIC queue pair (QP).

Example Clause TT, the method of any one of Example Clauses LL through SS, further comprising completing RNIC consumer requests prior to in-order completion and delivery of all preceding packets on the same RNIC queue pair (QP).

While Example Clauses LL through TT are described above with respect to a method, it is understood in the context of this disclosure that the subject matter of Example Clauses LL through TT can additionally or alternatively be implemented by a RNIC consumer module or via a device.

What is claimed is:

1. A remote direct memory access (RDMA) capable network interface card (RNIC) consumer device configured to provide interface functionality between an RNIC and an RNIC consumer, the RNIC consumer device comprising a hardware-based interface configured to interact with an RDMA transport mechanism of the RNIC, the RNIC consumer device comprising hardware-based logic that configures the RNIC consumer device to perform operations comprising:
   send, via the hardware-based interface to the RNIC, an upper layer protocol (ULP) request;
   receive, by the hardware-based interface from the RNIC, RDMA packets in response to the ULP request; and
   in response to receiving an out of order RDMA packet, continue completion of the ULP request by the hardware-based interface, including processing the out of order RDMA packet.

2. The RNIC consumer device of claim 1, wherein the RDMA transport mechanism is implemented in a lossy network.

3. The RNIC consumer device of claim 1, wherein headers of the RDMA packets include data usable to allow independent and out of order packet placement.

4. A device comprising at least one hardware-based component configured to provide interface functionality between a remote direct memory access (RDMA) capable network interface card (RNIC) and an RNIC consumer, the hardware-based component comprising a hardware-based interface configured to interact with an RDMA transport mechanism of the RNIC, the device comprising hardware-based logic that configures the device to perform operations comprising:
   sending, via the hardware-based interface to the RNIC, an upper layer protocol (ULP) request;
   receiving, by the hardware-based interface from the RNIC, RDMA packets in response to the ULP request; and
   in response to receiving an out of order RDMA packet, continuing completion of the ULP request by the hardware-based interface, including processing the out of order RDMA packet.

5. The device of claim 4, further configured to perform operations comprising using a Remote Key (RKey) and virtual address (VA) to identify a RNIC consumer request context and to access destination buffers.

6. The device of claim 4, further configured to perform operations comprising using received out of order RDMA Write and Read packets to identify a RNIC consumer request context and to access destination buffers.

7. The device of claim 4, further configured to perform operations comprising using a most significant nibble (MSN) of a received send message and a payload of a ULP response to identify a corresponding RNIC consumer request context.

8. The device of claim 4, configured to perform operations comprising tracking RDMA transfers and ULP responses associated with an RNIC consumer request context.

9. The device of claim 4, further configured to perform operations comprising completing an RNIC consumer request in response to detection of all required RDMA transfers and ULP responses even if portions of the RDMA transfers and ULP responses arrived out of order.

10. The device of claim 4, further configured to perform operations comprising completing an RNIC consumer request out of order with respect to other requests processed on a same or different RNIC queue pair (QP).

11. The device of claim 4, further configured to perform operations comprising completing RNIC consumer requests prior to in-order completion and delivery of all preceding packets on the same RNIC queue pair (QP).

12. A method for implementing remote direct memory access (RDMA) in a networked computing environment comprising one or more computing devices, the method performed by a RDMA capable network interface card (RNIC) consumer device configured to provide interface functionality between an RNIC and an RNIC consumer, the RNIC consumer device comprising a hardware-based interface configured to interact with an RDMA transport mechanism of the RNIC, the RNIC consumer device comprising hardware-based logic, the method comprising:
   sending, via the hardware-based interface to the RNIC, an upper layer protocol (ULP) request;
   receiving, by hardware-based interface from the RNIC, RDMA packets in response to the ULP request; and
   in response to receiving an out of order RDMA packet, continue completion of the ULP request by the hardware-based interface, including processing the out of order RDMA packet.

13. The method of claim 12, wherein headers of the RDMA packets include data usable to allow independent and out of order packet placement.

14. The method of claim 12, further comprising using a Remote Key (RKey) and virtual address (VA) to identify a RNIC consumer request context and to access destination buffers.

15. The method of claim 12, further comprising using received out of order RDMA Write and Read packets to identify a RNIC consumer request context and to access destination buffers.

16. The method of claim 12, further comprising using a most significant nibble (MSN) of a received send message and a payload of a ULP response to identify a corresponding RNIC consumer request context.

17. The method of claim 12, further comprising tracking RDMA transfers and ULP responses associated with an RNIC consumer request context.

18. The method of claim 12, further comprising completing an RNIC consumer request in response to detection of all required RDMA transfers and ULP responses even if portions of the RDMA transfers and ULP responses arrived out of order.

19. The method of claim 12, further comprising completing an RNIC consumer request out of order with respect to other requests processed on a same or different RNIC queue pair (QP).

20. The method of claim 12, further comprising completing RNIC consumer requests prior to in-order completion and delivery of all preceding packets on the same RNIC queue pair (QP).

\* \* \* \* \*